United States Patent
Hashimoto et al.

(10) Patent No.: US 8,818,421 B2
(45) Date of Patent: Aug. 26, 2014

(54) MOBILE COMMUNICATION TERMINAL AND LOCATION SYSTEM SELECTION METHOD

(75) Inventors: Jun Hashimoto, Tokyo (JP); Makoto Takahashi, Tokyo (JP); Kentaro Itagaki, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 13/699,125

(22) PCT Filed: May 25, 2011

(86) PCT No.: PCT/JP2011/062023
§ 371 (c)(1),
(2), (4) Date: Jan. 24, 2013

(87) PCT Pub. No.: WO2011/148993
PCT Pub. Date: Dec. 1, 2011

(65) Prior Publication Data
US 2013/0115975 A1 May 9, 2013

(30) Foreign Application Priority Data
May 25, 2010 (JP) .............................. P2010-119293

(51) Int. Cl.
*H04W 24/00* (2009.01)
(52) U.S. Cl.
USPC .................................... 455/456.6; 455/456.1
(58) Field of Classification Search
CPC ....... G01S 5/0263; G01S 19/48; H04W 24/00
USPC .................................................... 455/456.6
See application file for complete search history.

(56) References Cited

U.S. PATENT DOCUMENTS

2004/0185870 A1  9/2004  Matsuda

FOREIGN PATENT DOCUMENTS

| JP | 2004 156999 | 6/2004 |
|---|---|---|
| JP | 2004 235762 | 8/2004 |
| JP | 2007 322237 | 12/2007 |

OTHER PUBLICATIONS

Combined Office Action and Search Report issued Sep. 5, 2013 in Chinese Patent Application No. 201180024522.X (with English translation).
International Preliminary Report on Patentability and Written Opinion issued Dec. 20, 2012 in PCT/JP2011/062023 filed on May 25, 2011.
Japanese Office Action issued Mar. 13, 2012 in JP Patent Application No. P2010-119293 (with partial English translation).
International Search Report Issued Jul. 19, 2011 in PCT/JP11/62023 Filed May 25, 2011.

*Primary Examiner* — Charles Shedrick
(74) *Attorney, Agent, or Firm* — Oblon, Spival, McClelland, Maier & Neustadt, L.L.P.

(57) ABSTRACT

A mobile communication terminal (1) includes a mobile communication unit (13) that receives broadcast signals from base stations (2a, 2b, . . . ) through mobile communication, a wireless LAN positioning unit (12) that performs positioning calculation using wireless LAN communication, a GPS positioning unit (11) that performs positioning calculation through GPS positioning, a comparison unit (14) that compares the number of base stations from which broadcast signals are receivable by the mobile communication unit (13) with a predetermined number and determines whether the number of base stations is large or small, and a positioning system selection unit (15) that controls the wireless LAN positioning unit (12) to perform positioning calculation when the number of base stations is determined to be large and controls the GPS positioning unit (11) to perform positioning calculation when the number of base stations is determined to be small.

5 Claims, 3 Drawing Sheets

MOBILE COMMUNICATION TERMINAL AND LOCATION SYSTEM SELECTION METHOD

TECHNICAL FIELD

The present invention relates to a mobile communication terminal and a positioning system selection method.

BACKGROUND ART

In a positioning function incorporated in electronic equipment such as a mobile telephone and a car navigation system, a plurality of positioning systems such as positioning using signals from GPS (Global Positioning System) satellites and positioning using signals received from radio base stations of a mobile communication network are widely used.

For example, the following Patent Literature 1 discloses a mobile communication terminal capable of using GPS positioning, hybrid positioning that combines GPS positioning and positioning using signals from radio base stations, and cell sector positioning using signals from radio base stations. Further, positioning using signals from access points used for wireless LAN communication (which is referred to hereinafter as "wireless LAN positioning") is under review today.

CITATION LIST

Patent Literature

Patent literature 1: Japanese Patent Application Laid-Open Publication No. 2007-322237

SUMMARY OF INVENTION

Technical Problem

However, in the selection method of a positioning system described in the above Patent Literature 1, when it is determined that GPS single positioning is available based on the number of observed satellites, GPS positioning is preferentially used. Therefore, even when wireless LAN positioning is available, it has been difficult to achieve the efficient positioning calculation by selecting that positioning system. Further, in order to evaluate the accuracy of positioning calculation by wireless LAN positioning, it is necessary to determine the number of access points that can be observed, which causes an increase in processing load on a terminal.

The present invention has been accomplished to solve the above problems and an object of the present invention is thus to provide a mobile communication terminal and a positioning system selection method that can efficiently select a highly accurate calculation system among a plurality of positioning calculation systems including GPS positioning and wireless LAN positioning.

Solution to Problem

To solve the above problem, a mobile communication terminal according to one aspect of the present invention is a mobile communication terminal configured to be capable of positioning calculation by a plurality of positioning calculation systems, which includes a mobile communication means for receiving signals from a plurality of base stations through mobile communication, a first positioning calculation means for performing positioning calculation using wireless LAN communication, a second positioning calculation means for performing positioning calculation through GPS positioning, a comparison means for comparing the number of base stations from which signals are receivable by the mobile communication means with a predetermined number and determining whether the number of base stations is large or small, and a positioning system selection means for controlling the first positioning calculation means to perform positioning calculation when the number of base stations is determined to be large by the comparison means and controlling the second positioning calculation means to perform positioning calculation when the number of base stations is determined to be small by the comparison means.

A positioning system selection method according to another aspect of the present invention is a positioning system selection method for selecting a positioning calculation system among a plurality of positioning calculation systems when performing positioning calculation, which includes a mobile communication step of receiving signals from a plurality of base stations through mobile communication by a mobile communication means, a first positioning calculation step of performing positioning calculation using wireless LAN communication by a first positioning calculation means, a second positioning calculation step of performing positioning calculation through GPS positioning by a second positioning calculation means, a comparison step of comparing the number of base stations from which signals are receivable by the mobile communication means with a predetermined number and determining whether the number of base stations is large or small by a comparison means, and a positioning system selection step of controlling the first positioning calculation means to perform positioning calculation when the number of base stations is determined to be large in the comparison step and controlling the second positioning calculation means to perform positioning calculation when the number of base stations is determined to be small in the comparison step.

According to the mobile communication terminal or the positioning system selection method described above, when the number of base stations from which a signal can be received by the mobile communication means, which are nearby base stations, is large, positioning calculation using wireless LAN communication is preferentially carried out and, when the number of nearby base stations is small, positioning calculation through GPS positioning is preferentially carried out. Thus, whether it is an urban area or a suburban area is determined based on the number of nearby base stations, and a higher accuracy positioning system is selected according to the determination. In addition, the accuracy of positioning calculation using wireless LAN communication is determined through effective utilization of the communication function originally resided in the mobile communication terminal. It is thereby possible to efficiently select a highly accurate calculation system among a plurality of positioning calculation systems including GPS positioning and wireless LAN positioning.

Advantageous Effects of Invention

According to the present invention, it is possible to efficiently select a highly accurate calculation system among a plurality of positioning calculation systems including GPS positioning and wireless LAN positioning.

DESCRIPTION OF EMBODIMENTS

Preferred embodiments of a mobile communication terminal and a positioning system selection method according to the present invention will be described hereinafter in detail with reference to the drawings. It is noted that in the description of the drawings, the same elements will be denoted by the same reference symbols and redundant description will be omitted.

Figure 1:
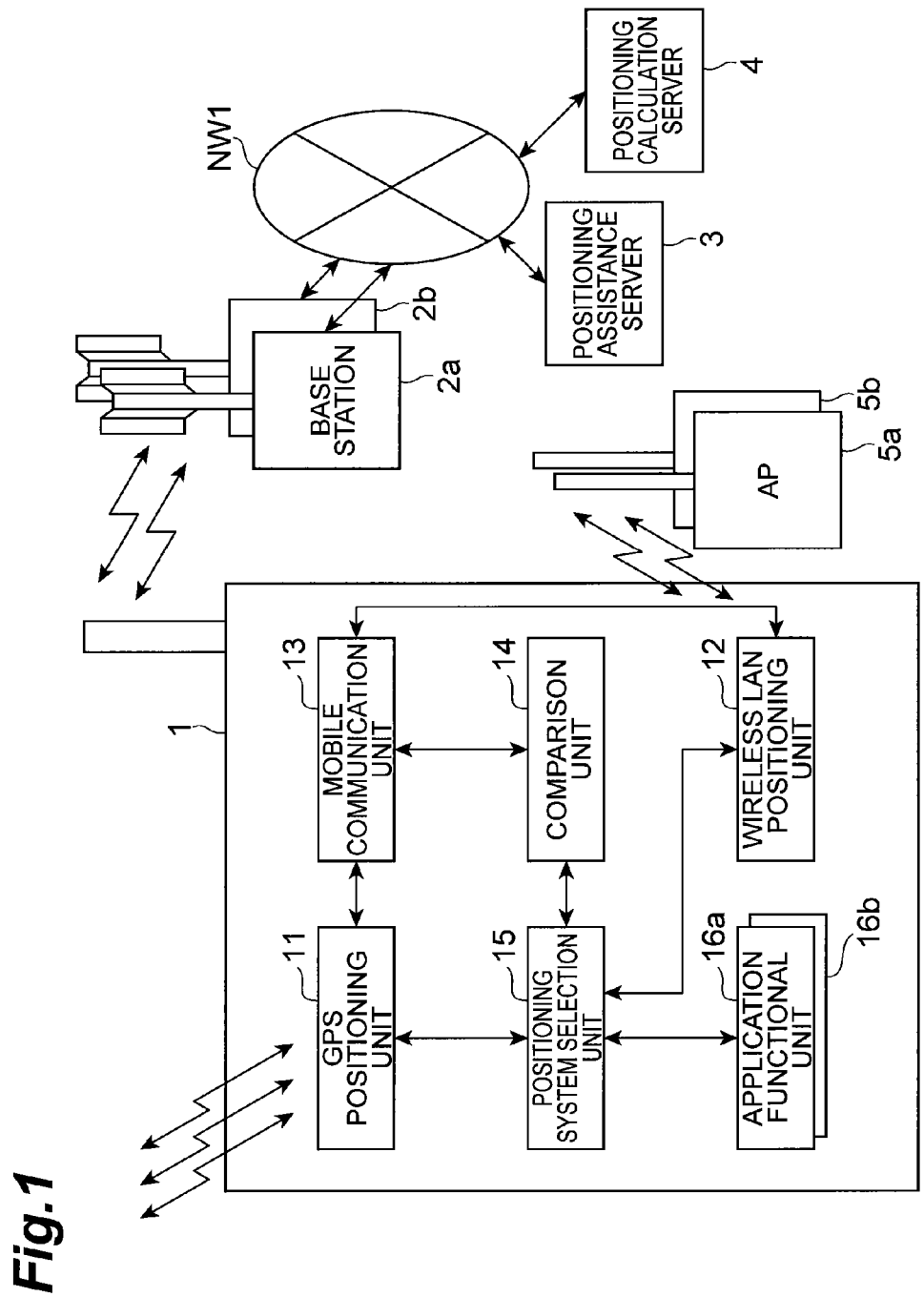
FIG. 1 is an outline schematic diagram showing a mobile communication terminal 1 according to a preferred embodiment of the present invention.

FIG. 1 is an outline schematic diagram showing a mobile communication terminal 1 according to a preferred embodiment of the present invention. The mobile communication terminal 1 shown therein is a mobile communication terminal such as a mobile telephone, a PDA (Personal Digital Assistance) or a smartphone having a communication function through mobile communication technology such as IMT (International Mobile Telecommunications) 2000 and a communication function through wireless LAN communication technology standardized by IEEE std 802.11 and further having a GPS positioning function using signals received from GPS satellites.

As shown therein, the mobile communication terminal 1 is configured to be connectable to a mobile communication network NW1 through any of a plurality of base stations 2a, 2b, ... located nearby. The mobile communication terminal 1 can thereby perform packet data communication and audio communication with various terminal devices or server devices connected to the mobile communication network NW1. Specifically, a positioning assistance server 3 that provides GPS positioning assistance data necessary for GPS positioning to the mobile communication terminal 1, and a positioning calculation server 4 that provides a positioning calculation result on the basis of positioning using wireless LAN (which is referred to hereinafter as "wireless LAN positioning") to the mobile communication terminal 1 are connected to the mobile communication network NW1, and the mobile communication terminal 1 can transmit and receive packet data to and from the positioning assistance server 3 and the positioning calculation server 4. Further, the mobile communication terminal 1 is configured to be connectable to a wireless LAN (not shown) through any of a plurality of wireless LAN access points 5a, 5b, ... located nearby. Note that, although two base stations and two wireless LAN access points existing in the vicinity of the mobile communication terminal 1 are shown, any number, such as three or more, of them may exist.

A hardware configuration and a functional configuration of the mobile communication terminal 1 are described hereinafter in detail.

Figure 2:
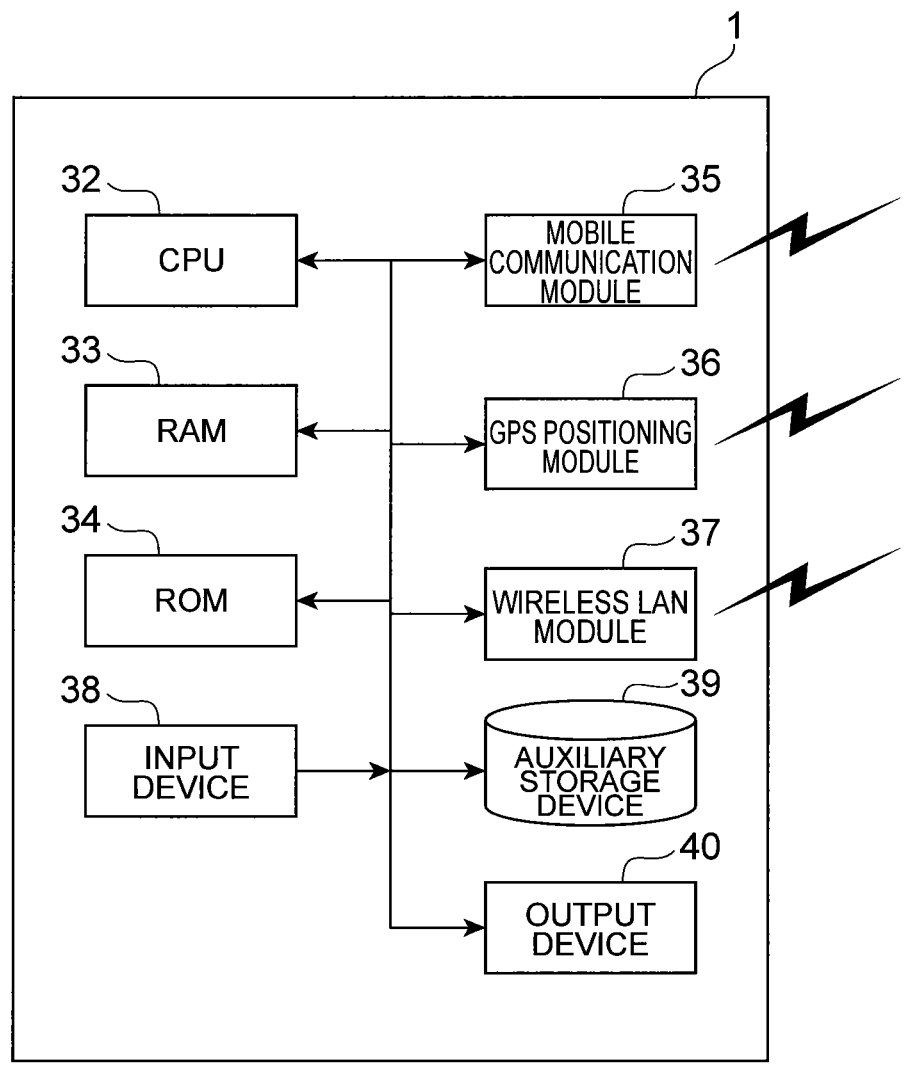
FIG. 2 is a block diagram showing a hardware configuration of the mobile communication terminal of FIG. 1.

As shown in FIG. 2, the mobile communication terminal 1 is physically configured as an information processing device that includes a CPU 32, RAM 33 and ROM 34 serving as a main memory unit, an auxiliary storage device 39 such as a hard disk device, an input device 38 such as an input key and mouse serving as an input device, an output device 40 such as a display and speaker, a mobile communication module 35 that governs transmission and reception of data with another terminal device, server device or facility in the mobile communication network NW1, a GPS positioning module 36 that receives signals from GPS satellites and conducts GPS positioning, and a wireless LAN module 37 that governs transmission and reception of data through wireless LAN communication. The functions implemented by the mobile communication terminal 1 are implemented by loading a prescribed program onto hardware such as the CPU 32 or the RAM 33 shown in FIG. 2, making the mobile communication module 35, the GPS positioning module 36, the wireless LAN module 37, the input device 38 and the output device 40 operate under control of the CPU 32, and performing reading and writing of data in the RAM 33 or the auxiliary storage device 39.

Referring back to FIG. 1, the mobile communication terminal 1 includes, as functional components, a GPS positioning unit (second positioning calculation means) 11, a wireless LAN positioning unit (first positioning calculation means) 12, a mobile communication unit (mobile communication means) 13, a comparison unit (comparison means) 14, a positioning system selection unit (positioning system selection means) 15, and application functional units 16a and 16b.

The application functional units 16a and 16b have a function of manipulating position information of the mobile communication terminal 1 which is acquired by the GPS positioning unit 11 or the wireless LAN positioning unit 12 into various data formats and providing the information to a user of the mobile communication terminal 1 or a user of another terminal. For example, the application functional units 16a and 16b have functions of acquiring map information, store information and the like corresponding to the position information from the mobile communication network NW1 and displaying the information, and transmitting emergency information notification using the position information to another terminal through the mobile communication network NW1.

The GPS positioning unit 11 performs positioning calculation through GPS positioning in order to acquire position information about the current position of the mobile communication terminal 1 by control of the positioning system selection unit 15. The GPS positioning unit 11 carries out the positioning calculation by receiving signals from GPS satellites using GPS positioning assistance data that is received from the positioning assistance server 3 through the mobile communication unit 13. Further, the GPS positioning unit 11 sends the position information about the mobile communication terminal 1 generated as a result of the positioning calculation back to the positioning system selection unit 15, together with positioning result information indicating whether the positioning result ends normally. Specifically, when the GPS positioning unit 11 fails to normally calculate the position information caused by a failure to catch a signal from GPS satellites or the like, it generates the positioning result information indicating abnormal termination of the positioning process.

The wireless LAN positioning unit 12 performs positioning calculation using wireless LAN positioning in order to acquire position information about the mobile communication terminal 1 by control of the positioning system selection unit 15. Specifically, the wireless LAN positioning unit 12 makes a search for a beacon signal from the wireless LAN access points 5a, 5b, . . . , which are equipment to serve as wireless LAN nodes. Then, the wireless LAN positioning unit 12 specifies identification information that identifies the wireless LAN access points 5a, 5b, . . . , which is contained in the beacon signal and radio field intensity information of the beacon signal and transmits them to the positioning calculation server 4 through the mobile communication unit 13. Further, the wireless LAN positioning unit 12 receives the position information calculated by the positioning calculation server 4 in response thereto through the mobile communication unit 13.

Further, the wireless LAN positioning unit 12 sends the position information generated by the positioning calculation back to the positioning system selection unit 15, together with positioning result information indicating whether the positioning result ends normally. When the wireless LAN positioning unit 12 fails to normally calculate the position information caused by a failure to catch the beacon signal from the wireless LAN access points 5a, 5b, . . . , or the like, it generates the positioning result information indicating abnormal termination of the positioning process.

Note that the time TTFF (Time To First Fix: Initial positioning time) required for positioning calculation by the GPS positioning unit 11 is typically about 10 to 15 seconds, and the time TTFF required for positioning calculation by the wireless LAN positioning unit 12 is about 1 to 2 seconds. Thus, the calculation time for positioning by the wireless LAN positioning unit 12 is significantly shorter than the calculation time for positioning by the GPS positioning unit 11. This is because GPS positioning uses radio waves from GPS satellites located at great distances while wireless LAN positioning uses radio waves of wireless LAN access points located at short distances.

The mobile communication unit 13 transmits and receives signals to and from a plurality of base stations 2a, 2b, . . . using the IMT2000 mobile communication system. The mobile communication unit 13 thereby transmits and receives data related to positioning calculation with the positioning assistance server 3 and the positioning calculation server 4 connected to the mobile communication network NW1. For example, the mobile communication unit 13 receives GPS positioning assistance data from the positioning assistance server 3 in response to a request from the GPS positioning unit 11. Further, the mobile communication unit 13 transmits the identification information and radio field intensity information about the wireless LAN access points 5a, 5b, . . . which are passed from the wireless LAN positioning unit 12 to the positioning calculation server 4 and receives position information calculated by the positioning calculation server 4 in response thereto.

Further, before positioning calculation is started by the positioning system selection unit 15, the mobile communication unit 13 receives, from a plurality of nearby base stations 2a, 2b, . . . , broadcast signals for announcing the presence of those base stations 2a, 2b, . . . to the mobile communication terminal. Note that the broadcast signals are received by the mobile communication unit 13 repeatedly at predetermined timing in order to keep the mobile communication terminal 1 connectable to the mobile communication network NW1. Then, the mobile communication unit 13 extracts "base station specifying information" contained in the broadcast signal which specifies the base station 2a, 2b, . . . from which the broadcast signal is transmitted and outputs the "base station specifying information" to the comparison unit 14.

The comparison unit 14 specifies the number of base stations from which the broadcast signal is received by the mobile communication unit 13 and determines whether the number of base stations is large or small based on the specified number. Specifically, the comparison unit 14 counts the number of base stations based on the "base station specifying information" output from the mobile communication unit 13. Then, the comparison unit 14 compares the number of base stations with a preset threshold $N_{th}$ and, determines that the number of base stations is "small" when the number of base stations is less than the threshold $N_{th}$ and determines that the number of base stations is "large" when the number of base stations is equal to or more than the threshold $N_{th}$. Note that, in response to a request for determination from the positioning system selection unit 15, the comparison unit 14 may count the number of base stations at the point of time or calculate the average value of the number of base stations within a past predetermined period and determine whether the number of base stations is large or small using the average value.

The positioning system selection unit 15 selects a positioning system between GPS positioning and wireless LAN positioning in response to a request for positioning from the application functional units 16a and 16b and makes control so that positioning calculation is carried out by either the GPS positioning unit 11 or the wireless LAN positioning unit 12 according to the selection. To be more specific, when the determination result by the comparison unit 14 indicates that the number of base stations is "large", the positioning system selection unit 15 determines that the mobile communication terminal 1 is located in an urban area and requests the wireless LAN positioning unit 12 to carry out positioning calculation. On the other hand, when the determination result indicates that the number of base stations is "small", the positioning system selection unit 15 determines that the mobile communication terminal 1 is located in a suburban area and requests the GPS positioning unit 11 to carry out positioning calculation.

Further, when positioning calculation by the positioning system selected according to the determination result by the comparison unit 14 has failed, the positioning system selection unit 15 makes control so that positioning calculation is carried out again by a positioning system different from the selected positioning system. Specifically, in the case where the wireless LAN positioning unit 12 is selected according to the determination result by the comparison unit 14 and a positioning process by the wireless LAN positioning unit 12 results in abnormal termination, the positioning system selection unit 15 requests the GPS positioning unit 11 to carry out positioning calculation again. On the other hand, in the case where the GPS positioning unit 11 is selected according to the determination result by the comparison unit 14 and a positioning process by the GPS positioning unit 11 results in abnormal termination, the positioning system selection unit 15 requests the wireless LAN positioning unit 12 to carry out positioning calculation again.

Figure 3:
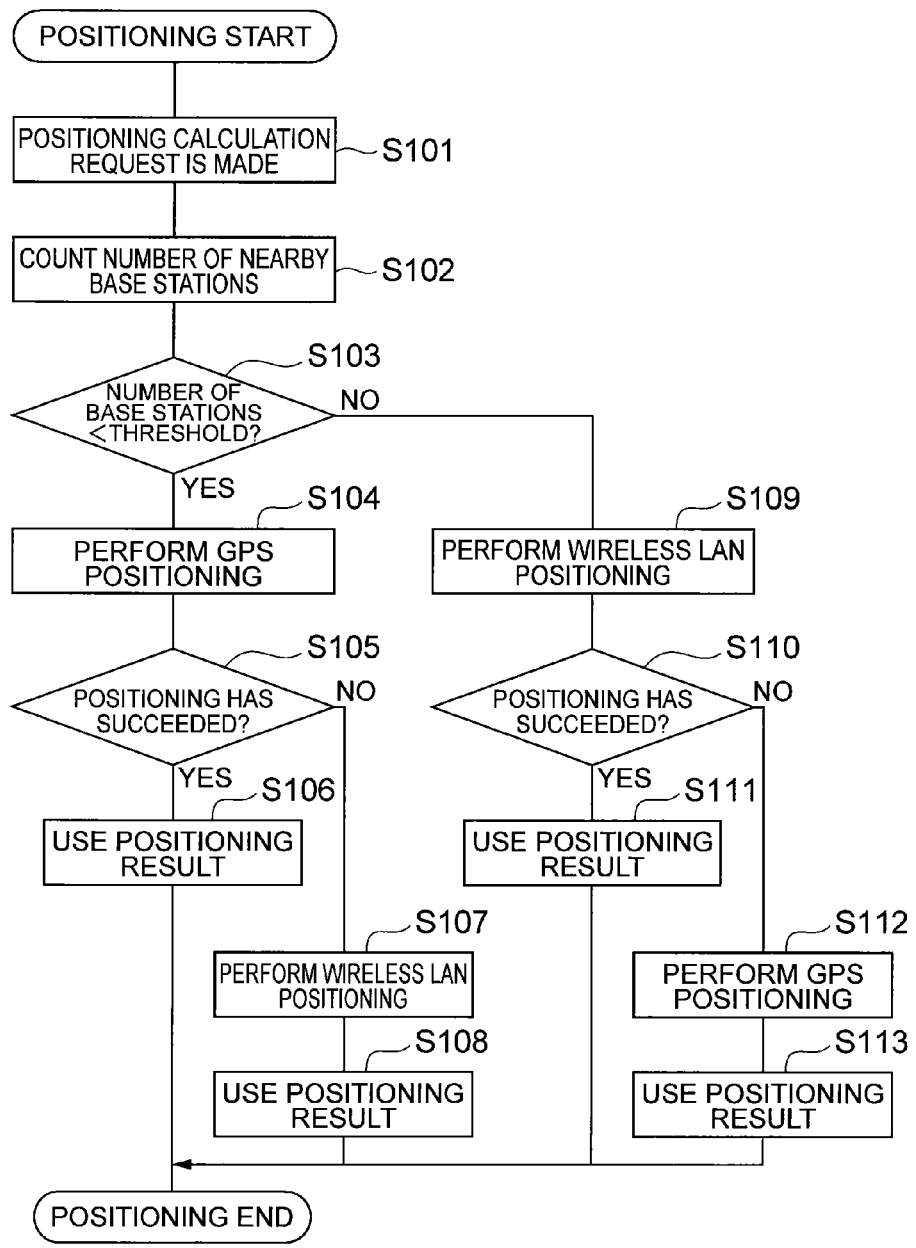
FIG. 3 is a flowchart showing an operation during a positioning process of the mobile communication terminal of FIG. 1.

The positioning operation of the mobile communication terminal and a positioning system selection method in the mobile communication terminal 1 are described hereinafter in detail with reference to FIG. 3. FIG. 3 is a flowchart showing an operation during a positioning process of the mobile communication terminal 1.

First, in the mobile communication terminal 1, a positioning request such as a request for acquiring contents using the application functional unit 16a, 16b is made (Step S101). Note that a trigger to start positioning is not limited to a request from a user of the mobile communication terminal 1, and it may be a request from another terminal device or the like connected to the mobile communication network NW1 or automatic start by the application functional unit 16a, 16b. In response to the positioning request, the comparison unit 14 of the mobile communication terminal 1 counts the number of nearby base stations (Step S102).

Then, the comparison unit 14 compares the counted number of nearby base stations with the threshold $N_{th}$ (Step S103). As a result of comparison, when the number of nearby base stations is less than the threshold $N_{th}$ (YES in S103), the positioning system selection unit 15 makes a request for positioning through GPS positioning, and makes control so that positioning calculation by the GPS positioning unit 11 is carried out (Step S104). After that, the GPS positioning unit 11 outputs position information and positioning result information, which are a result of the positioning calculation, to the positioning system selection unit 15, and the positioning system selection unit 15 determines whether the positioning calculation has succeeded or failed (Step S105). When the positioning calculation has succeeded (YES in Step S105), the position information is passed to the application functional unit 16a, 16b, manipulated into a predetermined output format by the application functional unit 16a, 16b, and then output to the output device 40 (Step S106). When, on the other hand, the positioning calculation has failed (NO in Step S105), the positioning system selection unit 15 makes a request for positioning through wireless LAN positioning and makes control so that positioning calculation is carried out again by the wireless LAN positioning unit 12 (Step S107). Then, position information and positioning result information generated by the wireless LAN positioning unit 12 are passed to the application functional unit 16a, 16b, output to the output device 40 by the application functional unit 16a, 16b (Step S108), and the positioning process thereby ends.

On the other hand, as a result of comparison by the comparison unit 14, when the number of nearby base stations is equal to or more than the threshold $N_{th}$ (NO in S103), the positioning system selection unit 15 makes a request for positioning through wireless LAN positioning, and makes control so that positioning calculation by the wireless LAN positioning unit 12 is carried out (Step S109). After that, the wireless LAN positioning unit 12 outputs position information and positioning result information, which are a result of the positioning calculation, to the positioning system selection unit 15, and the positioning system selection unit 15 determines whether the positioning calculation has succeeded or failed (Step S110). When the positioning calculation has succeeded (YES in Step S110), the position information is passed to the application functional unit 16a, 16b, manipulated into a predetermined output format by the application functional unit 16a, 16b, and then output to the output device 40 (Step S111). When, on the other hand, the positioning calculation has failed (NO in Step S110), the positioning system selection unit 15 makes a request for positioning through GPS positioning and makes control so that positioning calculation is carried out again by the GPS positioning unit 11 (Step S112). Then, position information and positioning result information generated by the GPS positioning unit 11 are passed to the application functional unit 16a, 16b, output to the output device 40 by the application functional unit 16a, 16b (Step S113), and the positioning process thereby ends.

According to the mobile communication terminal 1 and the positioning system selection method described above, when the number of base stations from which an broadcast signal can be received by the mobile communication unit 13, which are nearby base stations, is large, positioning calculation using wireless LAN communication is preferentially carried out and, when the number of nearby base stations is small, positioning calculation through GPS positioning is preferentially carried out. Thus, whether it is an urban area or a suburban area is determined based on the number of nearby base stations, and a higher accuracy positioning system is selected according to the determination. This is on the ground that, in urban areas, the accuracy of GPS positioning is expected to be low because there are many obstacles like buildings, whereas the accuracy of wireless LAN positioning is expected to be high and the positioning calculation time TTFF of wireless LAN positioning is short. On the other hand, in suburban areas, the accuracy of wireless LAN positioning is expected to be low because the installation density of wireless LAN access points is low, whereas the accuracy of GPS positioning is expected to be high because there are few obstacles.

In the above process, it is determined whether the area is urban or suburban by effective use of the function of receiving broadcast signals from base stations, which is the function originally resided in the mobile communication terminal 1. Consequently, it is possible to efficiently select the higher accuracy calculation system between wireless LAN positioning and GPS positioning without searching for a signal from wireless LAN access points.

Further, in the case where positioning calculation by the GPS positioning unit 11 or the wireless LAN positioning unit 12 has failed, the positioning system selection unit 15 makes control so that positioning calculation is carried out again by the wireless LAN positioning unit 12 or the GPS positioning unit 11, respectively, and therefore it is possible to reliably obtain a positioning calculation result through effective utilization of a plurality of positioning systems.

The present invention is not limited to the above-described embodiment. For example, although the GPS positioning unit 11 performs positioning calculation using GPS positioning assistance data in the system shown in FIG. 1, a self-positioning calculation system may be employed without using the GPS positioning assistance data.

Further, although the wireless LAN positioning unit 12 requests the positioning calculation server 4 to perform positioning calculation through wireless LAN positioning, the wireless LAN positioning unit 12 may directly perform positioning calculation.

Furthermore, although the comparison unit 14 counts the number of nearby base stations using "base station specifying information" extracted from the broadcast signal, it may count the number of cells using "cell identification information" contained in the broadcast signal which identifies a signal reach area (cell) in the vicinity of a base station and uses the count result as the number of nearby base stations.

Note that, when positioning calculation by a first or second positioning calculation means has failed, a positioning system selection means preferably makes control to carry out positioning calculation again by the second or first positioning calculation means, respectively. In this case, it is possible to reliably obtain a positioning calculation result through effective utilization of a plurality of positioning systems.

INDUSTRIAL APPLICABILITY

The present invention is applicable to a mobile communication terminal and a positioning system selection method and enables efficient selection of a higher accuracy positioning system among a plurality of positioning calculation systems including GPS positioning and wireless LAN positioning.

REFERENCE SIGNS LIST

1 . . . mobile communication terminal, 2a, 2b . . . base station, 11 . . . GPS positioning unit (second positioning calculation means), 12 . . . wireless LAN positioning unit (first positioning calculation means), 13 . . . mobile communication unit (mobile communication means), 14 . . . comparison unit (comparison means), 15 . . . positioning system selection unit (positioning system selection means)

The invention claimed is:

1. A mobile communication terminal configured to be capable of positioning calculations by a plurality of positioning calculation systems, comprising:
 a mobile communication means for receiving signals from a plurality of base stations through a mobile communication, the plurality of base stations being different from wireless LAN access points constituting a wireless LAN;
 a first positioning calculation means for performing a positioning calculation using at least one wireless LAN positioning calculation based on signals from the wireless LAN access points;
a second positioning calculation means for performing a positioning calculation through at least one GPS positioning;
 a comparison means for comparing a number of base stations from which the signals are received by the mobile communication means with a predetermined number, and determining whether the number of base stations is larger or smaller than the predetermined number; and
 a positioning system selection means for controlling the first positioning calculation means to perform the positioning calculation when the number of base stations is determined to be larger than the predetermined number by the comparison means and controlling the second positioning calculation means to perform the positioning calculation when the number of base stations is determined to be smaller than the predetermined number by the comparison means.

2. The mobile communication terminal according to claim 1, wherein
 when the positioning calculation by the first or second positioning calculation means has failed, the positioning system selection means controls the second or first positioning calculation means, respectively, to perform a positioning calculation again.

3. A positioning system selection method for selecting a positioning calculation system among a plurality of positioning calculation systems when performing positioning calculations, comprising:
 a mobile communication step of receiving signals from a plurality of base stations through a mobile communication by a mobile communication means, the plurality of base stations being different from wireless LAN access points constituting a wireless LAN;
 a first positioning calculation step of performing a positioning calculation using at least one wireless LAN positioning calculation based on signals from the wireless LAN access points by a first positioning calculation means;
 a second positioning calculation step of performing a positioning calculation through at least one GPS positioning by a second positioning calculation means;
 a comparison step of comparing a number of base stations from which the signals are received by the mobile communication means with a predetermined number, and determining whether the number of base stations is larger or smaller than the predetermined number; and
 a positioning system selection step of controlling the first positioning calculation means to perform the positioning calculation when the number of base stations is determined to be larger than the predetermined number in the comparison step and controlling the second positioning calculation means to perform the positioning calculation when the number of base statins is determined to be smaller than the predetermined number in the comparison step.

4. A mobile communication terminal, comprising:
circuitry configured to:
 receive signals from a plurality of base stations, the plurality of base stations being different from wireless LAN access points constituting a wireless LAN;
 perform a first positioning calculation using at least one wireless LAN positioning calculation based on signals from the wireless LAN access points;
 perform a second positioning calculation through at least one GPS positioning;
 compare a number of base stations from which the signals are received with a predetermined number, and determine whether the number of base stations is larger or smaller than the predetermined number; and
 perform the first positioning calculation when the number of base stations is determined to be larger than the predetermined number and perform the second positioning calculation when the number of base stations is determined to be smaller than the predetermined number.

5. The mobile communication terminal according to claim 4, wherein
 when the positioning calculation by the first or second positioning calculation has failed, the circuitry controls the second or first positioning calculation, respectively, to perform a positioning calculation again.

* * * * *